(12) United States Patent
Minai

(10) Patent No.: US 6,345,856 B1
(45) Date of Patent: Feb. 12, 2002

(54) REMOVABLE SEAT FOR AUTOMOBILE

(75) Inventor: Masamitsu Minai, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/570,133

(22) Filed: May 12, 2000

(51) Int. Cl.$^7$ .................................................. B60N 2/02
(52) U.S. Cl. ..................... 296/65.03; 297/336
(58) Field of Search ........................ 297/463.1, 463.2, 297/378.1, 325, 326, 331, 335, 336, 423.15; 296/65.01, 65.03, 65.05; 248/503.1

(56) References Cited

U.S. PATENT DOCUMENTS

| | | | | |
|---|---|---|---|---|
| 4,667,917 A | * | 5/1987 | Takace | |
| 5,039,166 A | * | 8/1991 | Kojho | |
| 5,330,245 A | * | 7/1994 | Boisset | |
| 5,697,662 A | * | 12/1997 | Leftwich | |
| 5,951,086 A | | 9/1999 | Hoshino et al. | |
| 6,056,346 A | * | 5/2000 | Smuk | |
| 6,227,130 B1 | * | 5/2001 | Tsumiyama et al. | |

* cited by examiner

Primary Examiner—Milton Nelson, Jr.
(74) Attorney, Agent, or Firm—Browdy and Neimark

(57) ABSTRACT

In a removable seat for automobile which has an unlocking lever projecting rearwardly thereof, a bar element is arranged such as to surround the unlocking lever, so that the unlocking lever is not only protected against contact with a foot or shoe of a person, but also can be grasped together with the bar element by one hand of a user for easy unlocking operation and carrying.

6 Claims, 3 Drawing Sheets

REMOVABLE SEAT FOR AUTOMOBILE

BACKGROUND OF INVENTION

1. Field of the Invention

The present invention relates to a removable seat which can be secured in and removed from an automobile, and in particular to an unlocking portion of such seat that allows for removal of the seat from the floor of automobile.

2. Description of Prior Art

Recent years, most of van-type automobiles or recreational vehicles have been designed to allow second and/or third seats to be removed therefrom to obtain a required load-carrying space or re-installed therein for increasing seats on which fellow passengers can sit, as required in either case. For that purpose, there have been an increased number of removable seats available in most of these sorts of automobiles.

Such removable seat is, for instance, known from the U.S. Pat. No. 5,951,086, according to which, forward and backward latch members are provided at the bottom of a seat cushion or seat slide device, via a lock mechanism, for releasable engagement over the respective forward and backward strikers fixed on the floor of automobile, so that the seat can be secured in and removed from the automobile by operation of the lock mechanism. The lock mechanism of this prior art includes a generally U-shaped operating lever projecting rearwardly of the seat, which has a lock release knob operatively connected with the two backward latch members. Upward operation of this U-shaped lever actuates both two backward latch members to release their locked engagement with the respective backward strikers. Then, after releasing both two forward latch members from the respective forward strikers as well, the seat can be removed from the floor.

This conventional removable seat, however, has been with such a problem that the operating lever, due to its rearward projection, will be easily contacted with a foot or shoe of a passenger sitting on a rear seat behind this kind of removable seat, and, in a worst case, it is highly possible that the rear-seat passenger will place his or her foot or shoe under the U-shaped operating lever and kick it up, resulting in an inadvertent lock release operation of the lock mechanism to make the seat unstable.

Hitherto solution to this problem has been merely by locating the operating lever at a lowest possible level close to the surface of floor, thereby narrowing a space between the lever and floor enough to prevent invasion of the foot or shoe therein and thus avoid any lock release operation of operating lever. But, such narrowed space between the operating lever and floor is found defective in that a user can hardly insert his fingers therein to grasp the lever, which deteriorates usability aspect in this solution.

SUMMARY OF THE INVENTION

In view of the above-stated drawbacks, it is a primary purpose of the present invention to provide an improved removable seat which prevents an unlocking lever against contact with a foot or shoe of a person and further permits the unlocking lever to be easily operated.

In order to achieve such purpose, in a removable seat securable to and removable from a floor of an automobile via a lock means including an unlocking lever means projecting rearwardly of the seat, wherein the unlocking lever means is operable to actuate said lock means in an unlocking direction to release the seat from a locked engagement with the floor, there is arranged, in accordance with the present invention, a bar means rearwardly of the seat such as to surround said unlocking lever means.

Accordingly, the unlocking lever means is not only protected by such bar means against contact with a foot or shoe of a person, but also a user can grasp both said bar means and unlocking lever means with his or her one hand to easily actuate the lock means in the foregoing locking direction, with a small force.

Preferably, the bar means may be positioned above the floor at such a level that not only prevents the foot or shoe of a person against contact with said unlocking lever means, but also permits the unlocking lever means to be located at a position where a user can grasp the unlocking lever with his or her one hand.

As one aspect of the present invention, the unlocking lever means may comprises a generally U-shaped unlocking lever having a handle portion and a pair of lateral portions, and the bar means be of a generally "U" shape larger than a whole size of such unlocking lever, including a main bar section and a pair of bar sections. In this instance, the bar means may be fixedly provided under the seat by fixing a part of each of the two bar sections thereof to the seat cushion, such that another remaining part of each of the same two bar sections and main bar section extend along the handle and two lateral portions of unlocking lever in a spaced-apart relation therewith.

Other advantages and features of the present invention will become apparent from reading of the descriptions hereinafter, with reference to the annexed drawings.

DETAILED DESCRIPTION OF PREFERRED EMBODIMENT OF THE INVENTION

From FIGS. 1 to 6, there is illustrated one preferred mode of a removable seat, generally designated by (S), in accordance with the present invention.

Figure 1:
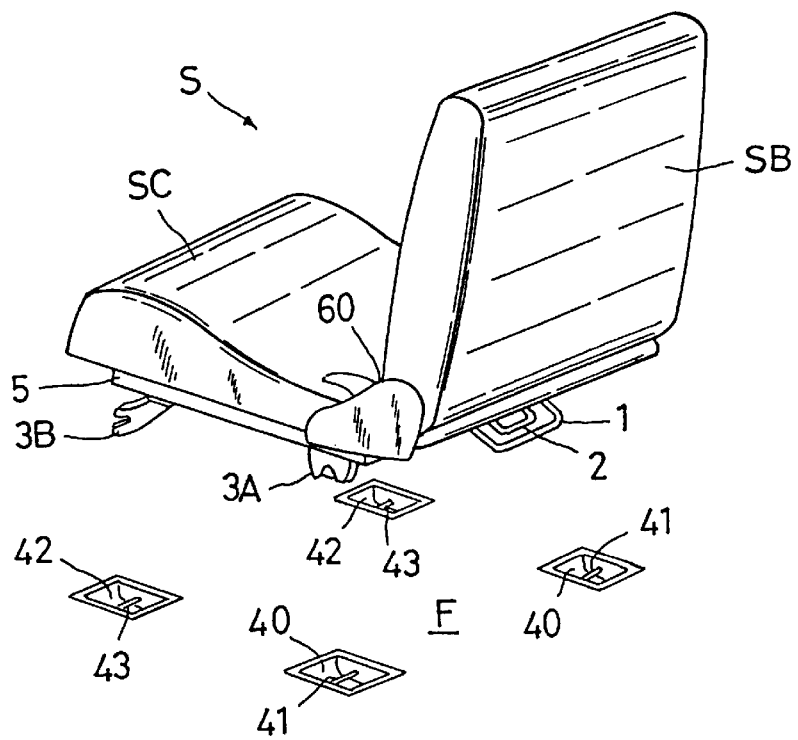
FIG. 1 is a perspective view showing the state where a removable seat with a rearward bar arrangement of the present invention is about to be secured to a floor of automobile.
Figure 2:
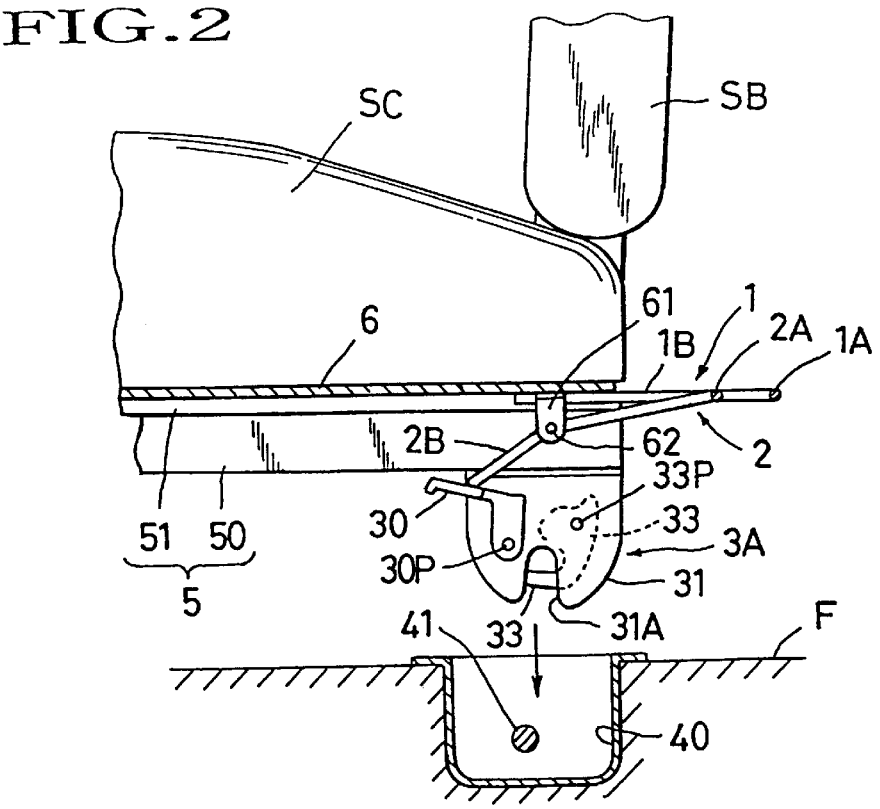
FIG. 2 is a fragmentary sectional view taken from the FIG. 1, which shows a principal part of the present invention.

FIG. 1 shows the state where the removable seat (S) is about to be lockingly secured to the floor (F) of an automobile (not shown). For that purpose, as can be seen from both FIGS. 1 and 3, a pair of forward strikers (43) and a pair of backward strikers (41) are provided in the floor (F), such that the former (43) are respectively disposed in the two recessed areas (42) while the latter (41) respectively disposed in the two recessed areas (40). On the other hand, the seat (S) is, at the bottom of its seat back (SB), provided with a pair of generally U-shaped or bifurcated claw brackets (3B) and a pair of latch devices (3A), such that the two claw brackets (3B) are engageable over the respective two forward strikers (43), while the two latch devices (3A) are latchingly engageable over the respective two backward strikers (41).

As is known, the removable seat (S) itself comprises a seat cushion (SC) and a seat back (SB) adjustably inclinable via a reclining device (60) with respect to the seat cushion (SC). Further, fixedly mounted on the bottom side of the seat (S) are a pair of seat slide devices (5) (5), as in FIG. 3, each comprising a stationary lower rail (50) and a movable upper rail (51) slidably fitted in the lower rail (50), the upper rail (51) being fixed on bottom wall of seat cushion frame (6) provided in the seat cushion (SC). As illustrated, the claw bracket (3B) and latch device (3A) are each fixedly attached to and dependent from the bottom side of each of the two lower rails (50).

Figure 5:
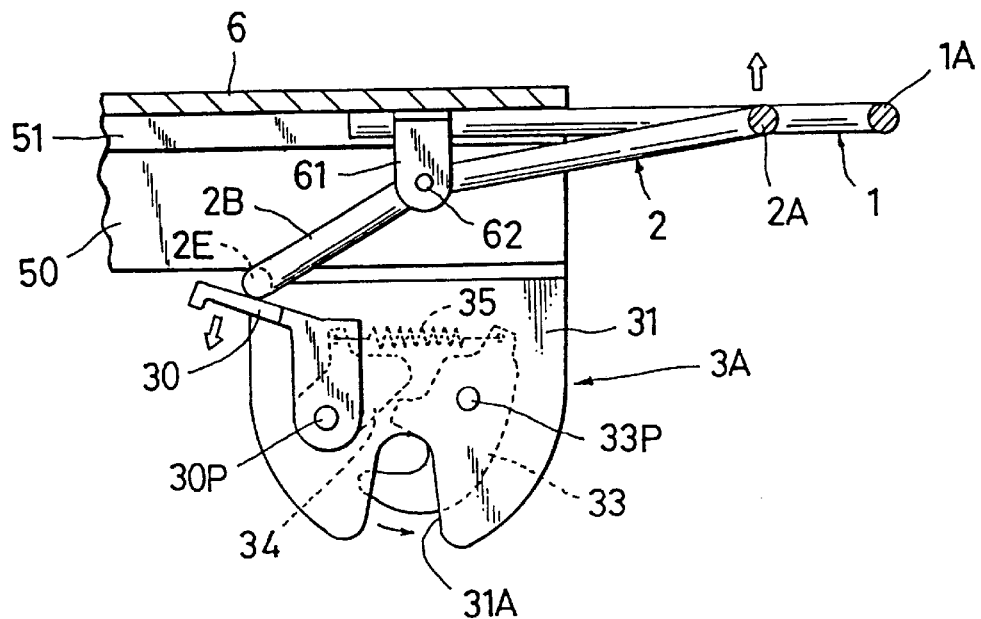
FIG. 5 is a fragmentary view partly in section, showing a principal part of the present invention.

The latch device (3A) is of a known type having a generally inverted-V-shaped housing (31) in which a slit (31A) is formed and adapted for engagement over the striker (41). In this housing (31), as shown in FIG. 5, a hook-like latch (33) is rotatably supported on a pin (33P) and a lock cam (34) is fixed on a pin (30P) which is rotatably journalled in the housing (31). A spring (35) is extended between the latch (33) and cam (34). Thus, the lock cam (34) is biasingly caused by the spring (35) to contact the latch (33) so that the free end of latch (33) is normally in the state of bridging the slit (31A), thereby placing the latch device (3A) in a locked state. An actuator piece (30) is fixed to the pin (30P) and operatively connected with the cam (34).

Figure 3:
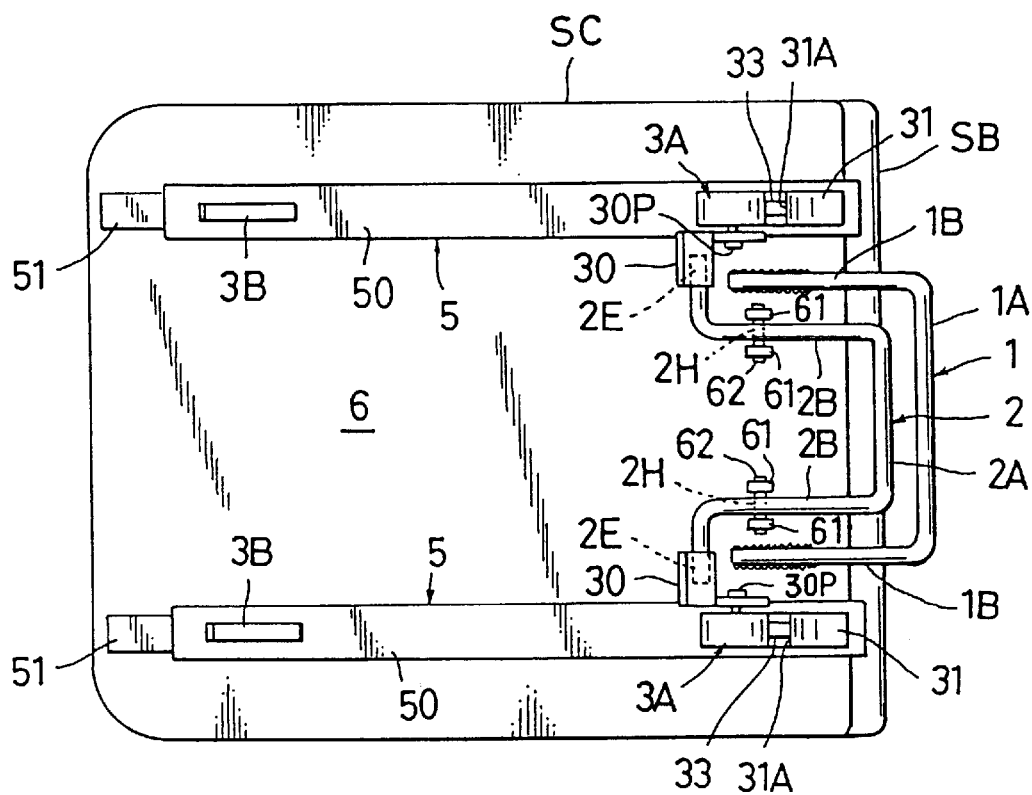
FIG. 3 is a bottom plan view of the removable seat.
Figure 4:
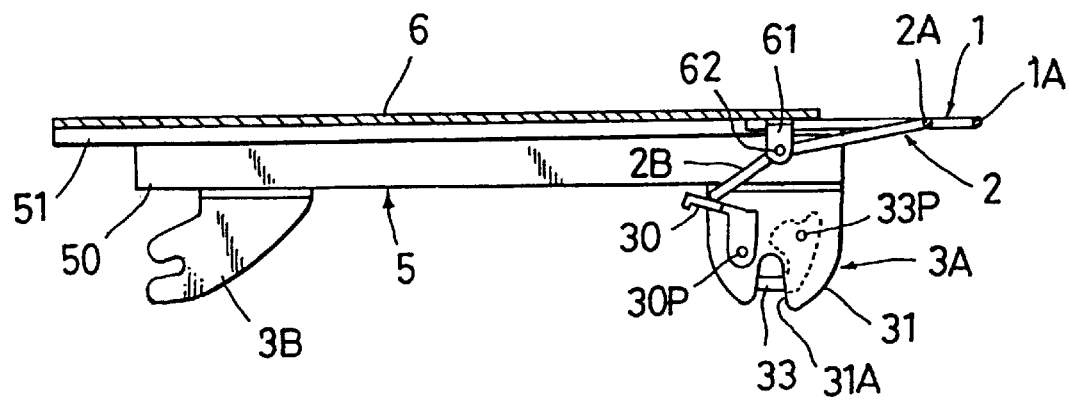
FIG. 4 is longitudinally sectional view showing a whole lock structure and rearward bar arrangement provided on the bottom side of a seat cushion frame.
Figure 6:
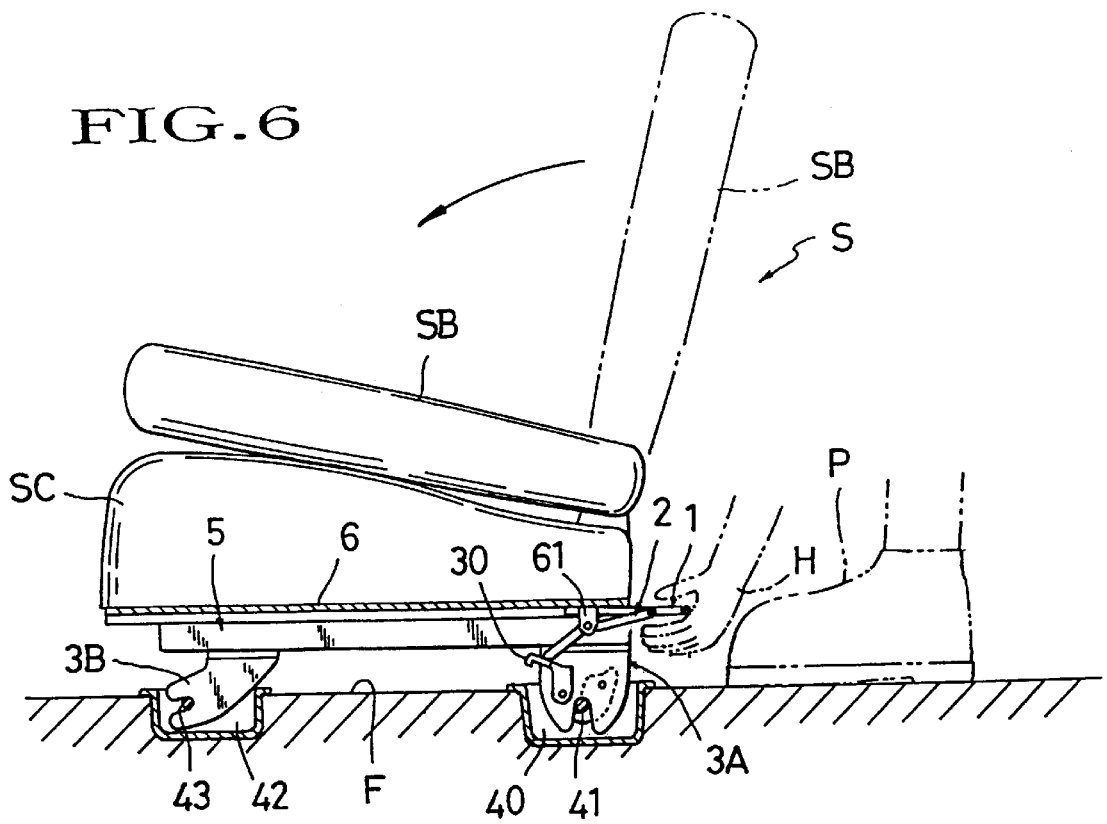
FIG. 6 is a fragmentary sectional schematic view which explanatorily shows the use and effect of the removable seat in accordance with the present invention.

As likewise in the U.S. Pat. No. 5,951,086 stated previously, a generally U-shaped unlocking lever (2) is arranged in the rearward end portion of seat cushion (SC) in an interlocking relation with both two latch devices (3A) by way of the two actuator pieces (30). The unlocking lever (2) is best depicted in FIG. 3 as being pivotally supported by brackets (61) fixed on the bottom wall of seat cushion frame (6) and projecting rearwardly of the seat cushion (SC). The lever (2) is formed to have a handle portion (2A), a pair of lateral lever sections (2B) (2B) and a pair of outwardly end portions (2E) (2E). Each of the two lateral lever sections (2B) is formed with a through-hole (2H). The two outwardly end potions (2E) extend from the respective two lateral lever section (2B) by a right angle in a direction opposite to each other. A pin (62) passes through the brackets (61) and through-hole (2H) of unlocking lever (2), so that the lever (2) can be rotated about the two pins (62) in the vertical direction. The two outwardly end portions (2E) of operating lever (2) are each connected with the respective two actuator pieces (30). Hence, as indicated by the arrows in FIG. 5, upward rotation of the unlocking lever (2) causes downward rotation of the two end portions (2E), which in turn causes simultaneous downward rotation of the actuator piece (30). This rotation further causes rotation of the cam (34), resulting in the anticlockwise rotation of the latch (33) to open the slit (31A) of latch device (3A). The handle portion (1A) of operating lever (1) projects outwardly and rearwardly of the seat cushion frame (6) to make it accessible by a user. It can be seen from FIG. 6 that the seat (S) is normally locked to the floor (F) since all the forward claw brackets (3B) and backward latch devices (3A) are respectively engaged over the forward and backward strikers (43) (41), and that, if it is desired to remove the seat (S) from the floor (F), one can grasp the handle portion (2A) of unlocking lever (2) with his or her hand, after having folded the seat back (SB) forwardly to the seat cushion (SC) as indicated in FIG. 6, and then rotate it upwardly to release both two latches (33) from engagement with the respective two strikers (41), while releasing both two claw brackets (3B) from the respective two strikers (43), to thereby allow the seat (S) to be removed from the floor (F). Conversely, the thus-removed seat (S) can again be secured on the floor (F) by simply engaging the two claw brackets (3B) over the respective two forward strikers (43) and then engaging the two latch devices (3A) over the respective two backward strikers (41).

In accordance with the present invention, a bar means is provided such as to surround the above-described unlocking lever (2) against any contact with external things or human's foot or shoe as found in the prior art. In the illustrated embodiment, such bar means is embodied by a generally U-shaped bar (1). More specifically, that U-shaped bar (1) is formed by bending a rigid metal bar material into a generally "U" shape, comprising a main bar section (1A) and a pair of lateral bar sections (1B) (1B), each extending from the respective two ends of the main bar section (1A) by a right angle . As shown in FIG. 3, the generally U-shaped bar (1) is fixed on the bottom wall of seat cushion frame (6), projecting rearwardly thereof such as to surround or extend alongside the handle and lateral portions (2A) (2B) of unlocking lever (2). A spacing is given between the protection bar (1) and those two portions (2A) (2B) of unlocking lever (2) so as to permit free vertical rotation of the lever (2) within the bar (1). In the shown embodiment, both two lateral bar sections (1B) of protection bar (1) are welded on the bottom wall of seat cushion frame (6) and extend alongside the respective two lateral portions (2B) (2B) of unlocking lever (2) to a point adjacent to the two end portions (2E) of the same lever (2).

With the above-described arrangement, as shown in FIG. 6, the bar (1) positively protects the handle and lateral portions (2A) (2B) of unlocking lever (2) against contact with the foot or shoe (P) of a passenger sitting on a rear seat behind the seat (S), thereby preventing undesired unlocking operation of the lever (2) by the foot or shoe (P), and further, it is possible to locate the unlocking lever (2) at a relatively high level from the floor (F), providing a space therebetween sufficient for a user's hand (H) to easily reach the lever (2). In this connection, it is important that the bar (1) be situated within a tolerable highest level from the floor (F), which can assure to prevent invasion of the foot or shoe (P) therethrough to the unlocking lever (2) while making that lever (2) readily accessible by the hand (H).

In addition, the arrangement of the bar (1) advantageously provides a guide and fulcrum effect allowing a user to easily grasp and rotate the unlocking lever (2) with a small force. This is because the main bar section (1A) of this bar (1) is disposed in front of the handle portion (2A) of unlocking lever (2) with a certain distance provided therebetween, so that, as indicated at (H) in FIG. 6, a user can readily grasp both those two portions (1A) (2A) with his or her one hand, at which moment, the user's fingers press the handle portion (2A) in the upward direction relative to his or her hand palm held on the main bar section (1A), which just provides a fulcrum effect, thus resulting in quick upward unlocking rotation of the lever (2) with a touch of small force. This in turn actuates both two latch devices (3A) to release engagement with the two respective strikers (41), permitting for removal of the seat (S) from the floor (F).

Moreover, when removing the seat (S) from the floor (F) with the above-described unlocking operation, the user can continue on to grasp the main bar section (1A) and therefore can carry the seat (S) in one hand to another place or a desired destination.

While having described the present invention as above, it should be understood that the invention is not limited to the illustrated embodiment, but any other modifications, replacements and additions may be structurally applied thereto without departing from the scopes of the appended claims.

What is claimed is:

1. A removable seat in combination with an automobile having a floor, comprising:

a seat cushion;

a seat back connected with said seat cushion;

a lock means for locking and unlocking said removable seat to and from said floor, thereby allowing the removable seat to be secured to and removed from the floor, said lock means including an unlocking lever means operable to actuate the lock means in an unlocking direction to release the seat from a locked engagement with the floor, wherein said unlocking lever means is provided under said seat cushion projecting from a side where said seat back lies in a direction rearwardly of the removable seat; and a rigid bar fixedly provided under said seat cushion;

said rigid bar having such a configuration that extends outwardly of and along a substantially whole portion of said unlocking lever means and being so arranged as to project from said side where the seat back lies in said direction rearwardly of the removable seat and surround the unlocking lever means.

2. The removable seat according to claim 1, wherein said configuration of the rigid bar is of a generally "U" shape including a pair of bar sections, and wherein said rigid bar is fixedly provided under said seat cushion by fixing said pair of bar sections thereof to the seat cushion such as to surround a substantial whole of said unlocking lever means in a spaced-apart relation therewith.

3. The removable seat as defined in claim 1, wherein said rigid bar is positioned above said floor at such level that not only prevents a foot or shoe of a person against contact with said unlocking lever means, but also permits said unlocking lever means to be located at a position where a user can grasp said unlocking lever with his or her one hand.

4. The removable seat as defined in claim 1, wherein said unlocking lever means comprises a generally U-shaped unlocking lever having a handle portion and a pair of lateral portions, wherein said pair of lateral portions are pivotally provided under the removable seat and operatively connected with said lock means, a generally unlocking lever of a larger size than a substantially whole size of said generally U-shaped unlocking lever, which comprises a main bar section and a pair or bar sections, wherein said rigid bar is fixedly provided under the removable seat by fixing a part of each of said pair of bar sections thereof to the removable seat, such that another remaining part of said each of said pair of bar sections and said main bar section extend along said handle portion and pair of lateral portions of generally U-shaped unlocking lever in a spaced-apart relation therewith, and wherein said handle portion and main bar section are so spaced apart from each other that they can be grasped together by one hand of a user so as to cause pivotal movement of said generally U-shaped unlocking lever to actuate said lock means in said unlocking direction.

5. The removable seat according to claim 1, wherein said unlocking lever means comprises a generally U-shaped unlocking lever having a handle portion and a pair of lateral portions, and wherein said configuration of the rigid bar is also of a generally "U" shape larger than a substantially whole size of said generally U-shaped unlocking lever, which comprises a main bar section and a pair of bar sections, and wherein said rigid bar is fixedly provided under said seat cushion by fixing a part of each of said pair of bar sections thereof to the seat cushion, such that another remaining part of said each of said pair of bar sections and said main bar section extend along said handle portion and said pair of lateral portions of the generally U-shaped unlocking lever in a spaced-apart relation therewith.

6. The removable seat according to claim 5, wherein said handle portion and main bar section, respectively of said generally U-shaped unlocking lever and said rigid bar, are so spaced apart from each other that they can be grasped together by one hand of a user.

* * * * *